United States Patent
Harrison

(10) Patent No.: US 9,019,244 B2
(45) Date of Patent: Apr. 28, 2015

(54) INPUT TOOLS HAVING VIOBRO-ACOUSTICALLY DISTINCT REGIONS AND COMPUTING DEVICE FOR USE WITH THE SAME

(71) Applicant: Qeexo, Co., San Jose, CA (US)

(72) Inventor: Christopher Harrison, Pittsburgh, PA (US)

(73) Assignee: Qeexo, Co., San Jose, CA (US)

( * ) Notice: Subject to any disclaimer, the term of this patent is extended or adjusted under 35 U.S.C. 154(b) by 137 days.

(21) Appl. No.: 13/780,494

(22) Filed: Feb. 28, 2013

(65) Prior Publication Data

US 2014/0240295 A1    Aug. 28, 2014

(51) Int. Cl.
*G06F 3/0354* (2013.01)
*G06F 3/038* (2013.01)
*G06F 3/041* (2006.01)

(52) U.S. Cl.
CPC ............ *G06F 3/03545* (2013.01); *G06F 3/038* (2013.01); *G06F 3/041* (2013.01)

(58) Field of Classification Search
CPC ............... G06F 3/04–3/0436; G06F 3/03545; H04R 17/04–17/08; H04R 9/16; B43K 23/00–23/128
USPC ....................... 345/179, 184, 177; 178/19.02; 310/313 R–313 D, 322, 334
See application file for complete search history.

(56) References Cited

U.S. PATENT DOCUMENTS

| | | | | |
|---|---|---|---|---|
| 2,430,005 | A * | 11/1947 | Denneen et al. | 148/574 |
| 3,354,531 | A * | 11/1967 | Pryor | 148/535 |
| 6,707,451 | B1 * | 3/2004 | Nagaoka | 345/179 |
| 2002/0070927 | A1 * | 6/2002 | Fujitsuka et al. | 345/179 |
| 2007/0126716 | A1 * | 6/2007 | Haverly | 345/179 |
| 2011/0018825 | A1 * | 1/2011 | Kondo et al. | 345/173 |
| 2014/0210788 | A1 | 7/2014 | Harrison et al. | |
| 2014/0289659 | A1 | 9/2014 | Harrison et al. | |

OTHER PUBLICATIONS

Non-Final Office Action—mailed on Jun. 24, 2014—U.S. Appl. No. 13/849,698, filed Mar. 23, 2013, titled: "Method and System for Activating Different Interactive Functions Using Different Types of Finger Contacts."
International Search Report and Written Opinion received for PCT Application No. PCT/US2010/049485 mailed on Nov. 17, 2014, 13 pages.
International Search Report and Written Opinion received for PCT Application No. PCT/US2014/34977 mailed on Sep. 18, 2014, 12 pages.
International Search Report and Written Opinion received for PCT Application No. PCT/US2012/060865 mailed on Mar. 29, 2013, 10 pages.

* cited by examiner

*Primary Examiner* — Liliana Cerullo
(74) *Attorney, Agent, or Firm* — IPV Law Group; David N. Tran

(57) ABSTRACT

An input tool includes a body in the form of a stylus with plurality of vibro-acoustically distinct regions. The vibro-acoustically distinct regions produce vibro-acoustic responses when the regions touch the surface of the touch screen. The vibro-acoustic responses are used in a computing device to detect what region of the input tool was used.

17 Claims, 3 Drawing Sheets

INPUT TOOLS HAVING VIOBRO-ACOUSTICALLY DISTINCT REGIONS AND COMPUTING DEVICE FOR USE WITH THE SAME

TECHNICAL FIELD

The present invention relates to a passive input tool; and more particularly, to an input tool having vibro-acoustically distinct regions and a computing device for use with the input tool.

BACKGROUND ART

Many technologies exist that have the ability to digitize different types of input. There are two main touch sensing approaches: active and passive. Passive devices include those that are receptive in a predictable manner to resistive, capacitive, acoustic surface wave, or electro-optical variations due to contact or touch by, for instance, a human finger or a stylus. Active devices include inductive and RF devices.

The key downside of active approaches is that an explicit object must be used (e.g., a special pen), which is implemented with electronics (and potentially batteries). This is more complex to manufacture. For example, pens augmented with infrared light emitters on their tips can be used on the commercially available Microsoft Surface.

Therefore, there is a need to construct a passive input tool without the need for electronics (including e.g., indirectly or wireless powered or EM coupled components including coils) or other active components.

SUMMARY

In view of the above, the present invention provides input tools having a plurality of vibro-acoustically distinct regions and a computing device interacting with the input tools.

In accordance with an aspect of the embodiment, there is provided an input tool for interacting with a touch screen, the input tool including:

a body in the form of a stylus, the body having one or more vibro-acoustically distinct regions, wherein each vibro-acoustically distinct region produces a discrete vibro-acoustic signal when it touches a surface of the touch screen, and the vibro-acoustic signal is used to detect what region of the input tool was used.

In accordance with another aspect of the embodiment, there is provided a computing device including:

a touch screen; an input tool having a body with one or more vibro-acoustically distinct regions, wherein each vibro-acoustically distinct region produces a discrete vibro-acoustic signal when it touches a surface of the touch screen; a touch event detector configured to detect the vibro-acoustic signal resulting from the touch of the vibro-acoustically distinct region; and a vibro-acoustic classifier configured to distinguish which region of the input tool was used using the vibro-acoustic signal.

BRIEF DESCRIPTION OF THE DRAWINGS

The above and other objects and features of the present invention will become apparent from the following description of the embodiments given in conjunction with the accompanying drawings, in which.

DETAILED DESCRIPTION

The advantages and features of exemplary embodiments and methods of accomplishing these will be clearly understood from the following embodiments taken in conjunction with the accompanying drawings. However, the exemplary embodiments are not limited and may be implemented in various forms. It should be noted that the present embodiments are provided to make a full disclosure and also to allow those skilled in the art to understand the full range of the exemplary embodiments. Therefore, the exemplary embodiments are to be defined only by the scope of the appended claims.

FIGS. 1A to 1G illustrate a variety of input tools with vibro-acoustically distinct regions that interact with a touch screen in accordance with embodiments of the present invention.

In general, a touch screen is an electronic visual display that a user can control through single or multi-touch gestures by touching the screen with one or more fingers. Some touch screens can also detect an object such as an input tool in the form of a stylus, which is optional for most modern touch screens. The touch screen enables the user to interact directly with what is displayed, rather than using a mouse, through the use of the input tool or the finger. Touch screens are common in devices such as game consoles, all-in-one computers, tablet computers, smartphones, and the like.

Figure 1A:
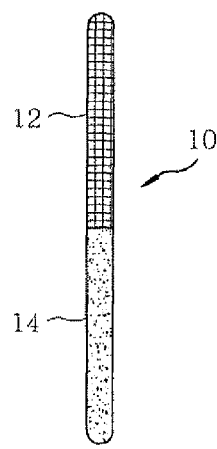
FIGS. 1A to 1G illustrate a variety of passive input tools with vibro-acoustically distinct regions in accordance with exemplary embodiments of the present invention.

The input tool of one exemplary embodiment is entirely passive, i.e., made of solid, passive materials. The input tool has vibro-acoustically distinct regions that can be used on a variety of input surface technologies, including capacitive, resistive, acoustic and infrared based screens. When such a tool touches a surface of the touch screen, it produces a vibro-acoustic response, both in the air, in the tool, and mechanical vibrations inside the contacting surface (especially when the latter is ridgid). By using different materials, material properties, coatings, and surface treatments, it is possible to construct passive tools) with vibro-acoustically distinct regions. Referring to the drawings, FIG. 1A illustrates a passive input tool having a body 10 in the form of a two ended stylus. The body 10 has one or more discrete material regions 12 and 14 at either end, which switch along the primary axis of the body 10. The discrete material regions 12 and 14 may be constructed by using different materials, e.g., steel, aluminum, or rubber, or material properties. It is noted that these distinct regions are controlled and engineered to have particular vibro-acoustic properties.

In one exemplary embodiment, the passive input tool may be used in an application for drawing and erasing functionality, fine drawing and highlighting functionality, fine drawing and thick brush functionality, or summoning a contextual menu.

Figure 1B:
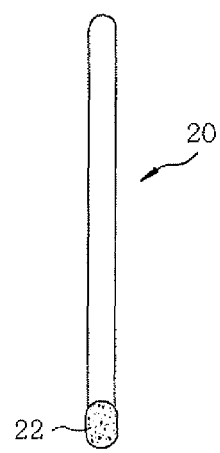

FIG. 1B illustrates a passive input tool having a body 20 in the form of an elongated stylus. The body 20 has one or more discrete material region or tip such as a small tip 22 at one end whose material is different from that of the main body 20 of the passive input tool. In one exemplary embodiment, this tool may be used in an application for drawing and erasing functionality, fine drawing and highlighting functionality, fine drawing and thick brush functionality, or summoning a contextual menu.

Alternatively, different material properties (e.g., rubber density, cold-rolled steel), coatings (e.g., galvanized, rubberized, hard clear coat), and surface treatments (e.g., heat-treated, brushed, pitted) may also be used in the different regions or tips.

Figure 1C:
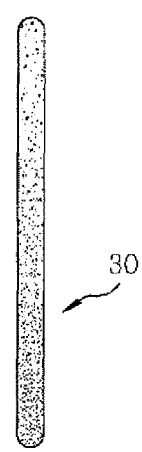

FIG. 1C illustrates a passive input tool having a body 30 in the form of an elongated stylus. The body 30 has one or more discrete material regions through the entire body, which exhibit continuously varying material properties, e.g., a heat-treatment gradient. In one exemplary embodiment, this tool may be used in an application for a drawing and erasing functionality, fine drawing and highlighting functionality, fine drawing and thick brush functionality, or summoning a contextual menu.

Figure 1D:
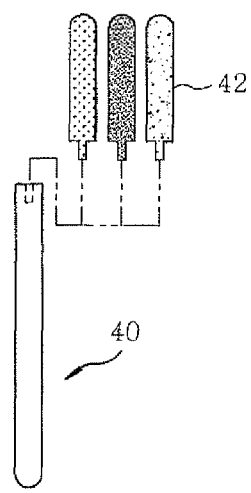

FIG. 1D illustrates a passive input tool having a body 40 in the form of a stylus. The body 40 has one or more discrete material regions such as swappable tips 42 or regions for which, for example, a magnetic clip or screw mount is formed at one end of the body 40. The swappable tips 42 may have different materials or different material properties, which could be used for different tasks.

Figure 1E:
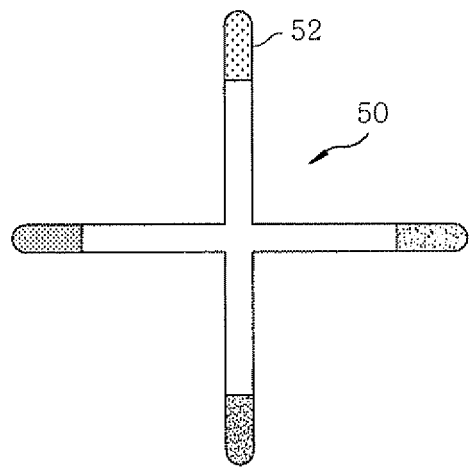

FIG. 1E illustrates a passive input tool having a body 50 in the form of a multi-ended stylus (e.g., X-shaped stylus). The body 50 has one or more discrete material regions 52 or tips at branched ends of the body.

Figure 1F:
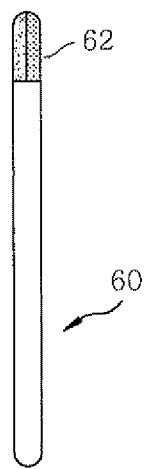

FIG. 1F illustrates a passive input tool having a body 60 in the form of a pen-shaped stylus. The body 60 has one or more discrete material regions or tips such as a two-sided tip 62 or region at one end. The two-sided region 62 or tip may have different materials or different material properties. It is also possible for a stylus to have three, four or more materials in one tip.

Figure 1G:
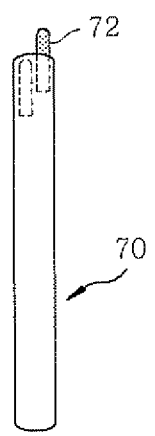

FIG. 1G illustrates a passive input tool having a body 70 in the form of a stylus. The body 70 has discrete material regions or tips such as retractable regions 72 or tips at one end. The retractable regions 72 or tips may have different materials or different material properties.

When an object strikes a certain material, vibro-acoustic waves propagate outward through the material on the surface of the material. Typically, interactive surfaces use rigid materials, such as plastic or glass, which both quickly distribute and faithfully preserve the signal. As described above, when the respective regions of the input tool shown in FIGS. 1A to 1G touch a surface of a touch screen, vibro-acoustic responses are produced, which have different characteristics relating to the material of which they are composed. Because different regions of the input tool are vibro-acoustically distinct, it is possible to detect what part of the input tool was used. This relies on the physical principle that different materials produce different vibro-acoustic features and have different resonant frequencies.

Figure 2:
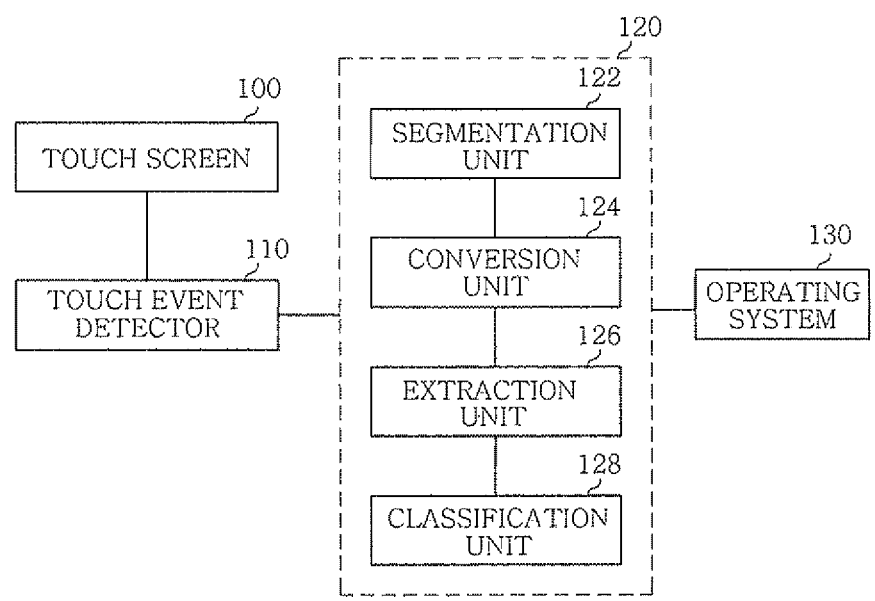
FIG. 2 illustrates a block diagram of a computing device that can distinguish regions of the passive input tools shown in FIGS. 1A to 1G in accordance with exemplary embodiments of the present invention.

FIG. 2 illustrates a block diagram of a computing device for use with the input tools illustrated in FIGS. 1A to 1G.

The computing device includes the touch screen that interacts with the input tools as shown in FIGS. 1A to 1G. The computing device detects different vibro-acoustic responses resulting from the regions or the tips of the input tool touching the touch screen and classifies what regions or tips were used.

The computing device of exemplary embodiments may have an operating system (OS), and can run various types of application software, known as apps. The computing device may also be equipped with a telecommunication capability that can allow connections to the communication network. Such a computing device may include, but not limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 2, the computing device includes a touch screen 100, a touch event detector 110, a vibro-acoustic classifier 120, and an operating system (OS) 130.

The touch screen 100 is an electronic visual display and serves also an input/out device supplementing or substituted for a keyboard, a mouse, and/or other input devices. The touch screen 100 is sensitive to touch contacts; a user interacts with the user interface by touching interactive elements, such as pictures or words displayed on the touch screen with tips or regions of the input tool or a finger. When there is a touch event that a tip or region of the input tool touches a surface of the touch screen 100, a vibro-acoustic signal is generated due to the touch event.

The touch event detector 110 detects the touch event using the input tool. The touch event detector 110, for example, may be arranged at a rear side of the touch screen 100 so that the vibro-acoustic signal caused by the touch event can be captured.

The touch event detector 110 can be triggered by the onset of a vitro-acoustic response resulting from the input tool touching the touch screen 100. To capture the touch event and subsequent vibro-acoustic signals, the touch event detector 110 may include one or more impact sensors, vibration sensors, accelerometers, strain gauges, or acoustic sensors such as a condenser microphone, a piezoelectric microphone, MEMS microphone and the like.

Once the vibro-acoustic signal has been captured by the touch event detector 110, the vibro-acoustic classifier 120 processes the vibro-acoustic signal to distinguish which tip or region of the input tool was used. Based on the distinguished tip or region of the input tool, the vibro-acoustic classifier 120 may allow the OS 130 to do a predetermined capability, such as drawing and erasing capability, fine drawing and highlighting functionality, fine drawing and thick brush functionality, painting in different colors, summoning a contextual menu, and the like.

The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 to derive a series of features from the electrical signal; and a classification unit 128 to classify the touch event using the features to distinguish what tip or region of the input tool was used for the touch event.

The segmentation unit 122 samples the vibro-acoustic signal, for example, at a sampling rate of 96 kHz, using a sliding window of 4096 samples of the vibro-acoustic signal.

The conversion unit 124 then performs, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may further downsample this data into additional vectors (i.e., buckets of ten), providing a different aliasing. In addition, additional time domain features may be calculated from the vibro-acoustic signal, such as the average absolute amplitude, total absolute amplitude, standard deviation of the absolute amplitude, center of mass for both the segmented input signal and the Fourier Transformed signal, and zero crossings.

The feature extraction unit 126 may also calculate a series of features from the frequency domain representation of the vibro-acoustic signals, such as the fundamental frequency of the impact waveform.

The classification unit 128 classifies the vibro-acoustic signal using the features to distinguish what tip or region of the input tool was used to generate the touch event.

To aid classification, the user can provide supplemental training samples to the vibro-acoustic classifier 120.

In one exemplary embodiment, the classification unit 128 may be implemented with a support vector machine (SVM) for feature classification. The SVM is a supervised learning model with associated learning algorithms that analyze data and recognize patterns, used for classification and regression analysis.

While the present invention has been shown and described with respect to the exemplary embodiments, the present invention is not limited thereto. It will be understood by those skilled in the art that various changes and modifications may be made without departing from the scope of the present invention as defined in the following claims.

What is claimed is:

1. An input tool for interacting with a touch screen, the input tool comprising:
    a body in the form of a stylus, the body having a material with different surface treatments of the material to form one or more vibro-acoustically distinct regions, wherein each vibro-acoustically distinct region produces a discrete vibro-acoustic signal when the input tool touches a surface of the touch screen, and wherein the vibro-acoustic signal is used to detect what region of the input tool was used.

2. The input tool of claim 1, wherein the vibro-acoustically distinct regions are formed using different heat treatments.

3. The input tool of claim 1, wherein the vibro-acoustically distinct regions are formed using different brush treatments.

4. The input tool of claim 1, wherein the vibro-acoustically distinct regions are formed with a pitted surface treatment.

5. The input tool of claim 1, wherein the vibro-acoustically distinct regions are formed with continuously varying surface treatment along a primary axis of the body.

6. The input tool of claim 1, wherein the vibro-acoustically distinct regions are configured to switch along a primary axis of the body.

7. The input tool of claim 1, wherein the vibro-acoustically distinct regions are formed at either end or one end of the body.

8. A computing device comprising:
    a touch screen;
    an input tool having a body of a material with two or more vibro-acoustically distinct regions formed by applying different surface treatment gradiently to the material along a primary axis of the body, wherein each vibro-acoustically distinct region produces a discrete vibro-acoustic signal when the input tool touches a surface of the touch screen;
    a touch event detector configured to detect the vibro-acoustic signal resulting from the touch of the vibro-acoustically distinct region; and
    a vibro-acoustic classifier configured to distinguish which region of the input tool was used using the vibro-acoustic signal.

9. The computing device of claim 8, wherein the vibro-acoustic classifier comprises:
    a conversion unit configured to convert the vibro-acoustic signal into an electrical signal;
    an extraction unit configured to derive a series of features representative of the touch by the vibro-acoustically distinct region from the electrical signal; and
    a classification unit configured to identify the vibro-acoustically distinct region of the input tool.

10. The computing device of claim 8, wherein the vibro-acoustically distinct regions are formed using different surface treatments.

11. The computing device of claim 10, wherein the different surface treatment includes a brush treatment.

12. The computing device of claim 10, wherein the different surface treatment includes a heat-treatment.

13. The computing device of claim 10, wherein the different surface treatment includes a pitted surface treatment.

14. A computing device comprising:
    a touch screen;
    an input tool having a body with two or more vibro-acoustically distinct regions formed at one end of the body, wherein each of the vibro-acoustically distinct regions is associated with a different surface treatment of a material of the body, wherein each vibro-acoustically distinct region produces a discrete vibro-acoustic signal when the input tool touches a surface of the touch screen;
    a touch event detector configured to detect the vibro-acoustic signal resulting from the touch of the vibro-acoustically distinct region; and
    a vibro-acoustic classifier configured to distinguish which region of the input tool was used using the vibro-acoustic signal.

15. The computing device of claim 14, wherein the vibro-acoustic classifier comprises:
    a conversion unit configured to convert the vibro-acoustic signal into an electrical signal;
    an extraction unit configured to derive a series of features representative of the touch by the vibro-acoustically distinct region from the electrical signal; and
    a classification unit configured to identify the vibro-acoustically distinct region of the input tool.

16. The computing device of claim 14, wherein two of the vibro-acoustically distinct regions formed at one end of the body is associated with a two-sided tip with a first side associated with a first surface treatment and a second side associated with a second surface treatment.

17. The computing device of claim 14, wherein different surface treatments include brush treatment, heat treatment and pitted treatment.

* * * * *

UNITED STATES PATENT AND TRADEMARK OFFICE
CERTIFICATE OF CORRECTION

PATENT NO. : 9,019,244 B2  
APPLICATION NO. : 13/780494  
DATED : April 28, 2015  
INVENTOR(S) : Christopher Harrison Page 1 of 1

It is certified that error appears in the above-identified patent and that said Letters Patent is hereby corrected as shown below:

On the title page, item [54], that portion of the title reading "VIOBRO-ACOUSTICALLY" should read --VIBRO-ACOUSTICALLY--

In the specification

In column 1, line 2, the portion of the title reading "VIOBRO-ACOUSTICALLY" should read --VIBRO-ACOUSTICALLY--

Signed and Sealed this  
Sixth Day of October, 2015

Michelle K. Lee  
*Director of the United States Patent and Trademark Office*